United States Patent
Odashima et al.

(10) Patent No.: US 6,828,936 B2
(45) Date of Patent: Dec. 7, 2004

(54) NAVIGATION APPARATUS FOR MOBILE VEHICLE AND NAVIGATION COMMUNICATION SYSTEM

(75) Inventors: Masahiro Odashima, Kawagoe (JP); Koji Sakuma, Kawagoe (JP); Tadamasa Yamanaka, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/935,054

(22) Filed: Aug. 23, 2001

(65) Prior Publication Data

US 2002/0089445 A1 Jul. 11, 2002

(30) Foreign Application Priority Data

Aug. 23, 2000 (JP) ........................................ 2000-252482

(51) Int. Cl.⁷ ............................ G01S 3/02; B60R 25/10; G08G 1/123
(52) U.S. Cl. ............. 342/455; 342/357.08; 340/426.19; 340/995.14; 340/995.27; 340/961
(58) Field of Search ....................... 342/357.07, 357.08, 342/357.09, 455; 340/539.13, 426.19

(56) References Cited

U.S. PATENT DOCUMENTS

| | | | | | |
|---|---|---|---|---|---|
| 4,835,537 A | * | 5/1989 | Manion | ...................... | 340/961 |
| 5,317,321 A | * | 5/1994 | Sass | ........................... | 342/176 |
| 5,731,785 A | * | 3/1998 | Lemelson et al. | ...... | 342/357.07 |
| 5,959,529 A | * | 9/1999 | Kail, IV | ................ | 340/539.12 |
| 6,373,430 B1 | * | 4/2002 | Beason et al. | ......... | 342/357.06 |
| 6,414,630 B1 | * | 7/2002 | Usui | ..................... | 342/357.09 |

* cited by examiner

*Primary Examiner*—Gregory C. Issing
(74) *Attorney, Agent, or Firm*—Morgan, Lewis & Bockius LLP (57) ABSTRACT

A vehicle-equipped navigation apparatus and a navigation communication system which are capable of providing a clear display and preventing own vehicle position information from draining out to third parties. A setting part is provided for setting a remote vehicle either in a valid state or in an invalid state, such that only a remote vehicle position transmitted from a remote vehicle set in the valid state is displayed on a display together with an own vehicle position.

4 Claims, 12 Drawing Sheets

REMOTE VEHICLE POSITION REQUEST MESSAGE

| OPR | REQUESTING VEHICLE ID | REQUESTED VEHICLE ID |
|---|---|---|

OPR : REMOTE VEHICLE POSITION REQUEST CODE

VEHICLE POSITION SPONTANEOUS TRANSMISSION MESSAGE

| CPT | ORIGINATING VEHICLE ID | DESTINATION VEHICLE ID | VEHICLE POSITION INFORMATION |
|---|---|---|---|

CPT : VEHICLE POSITION SPONTANEOUS TRANSMISSION CODE

| VEHICLE POSITION REQUEST MESSAGE | CPR | REQUESTING VEHICLE ID | REQUESTED VEHICLE ID | MESSAGE NUMBER |
|---|---|---|---|---|

CPR : VEHICLE POSITION REQUEST CODE

FIG. 11

| RETURN VEHICLE POSITION MESSAGE | RCP | REQUESTING VEHICLE ID | REQUESTED VEHICLE ID | MESSAGE NUMBER MN | VEHICLE POSITION INFORMATION |
|---|---|---|---|---|---|

RCP : RETURN VEHICLE POSITION CODE

FIG. 13

| RETURN VEHICLE POSITION MESSAGE | RCP | REQUESTING VEHICLE ID | REQUESTED VEHICLE ID | MESSAGE NUMBER MN | ERR1 |
|---|---|---|---|---|---|

RCP : RETURN VEHICLE POSITION CODE
ERR1 : FIRST ERROR CODE

FIG. 14

| RETURN VEHICLE POSITION MESSAGE | RCP | REQUESTING VEHICLE ID | REQUESTED VEHICLE ID | MESSAGE NUMBER MN | ERR2 |
|---|---|---|---|---|---|

RCP : RETURN VEHICLE POSITION CODE
ERR2 : SECOND ERROR CODE

NAVIGATION APPARATUS FOR MOBILE VEHICLE AND NAVIGATION COMMUNICATION SYSTEM

BACKGROUND OF THE INVENTION

1. Field of the Invention

The present invention relates to a navigation apparatus and a navigation system for displaying a current position of a mobile vehicle.

2. Description of the Related Art

Nowadays, a navigation apparatus for mounting in a vehicle, referred to as in-vehicle navigation system hereinafter, is commercially available, which utilizes GPS (Global Positioning System) satellites or the like to calculate a current position of a vehicle and display a mark indicative of the current position superimposed on a displayed map. Furthermore, a study has been made on a type of in-vehicle navigation apparatus having a communication function which transmits a current position mutually with a plurality of vehicles so that the positions of other vehicles as well as the position of the vehicle itself can be displayed on the some screen.

However, with such an in-vehicle navigation apparatus a problem may be encountered that, as the number of vehicles increases, a larger number of position marks appear on the display screen to result in an disorderly display, and also the position of the vehicle would be known to unintended third parties.

OBJECT AND SUMMARY OF THE INVENTION

The present invention has been made to solve the above problem, and an object of the present invention is to provide a mobile vehicle navigation apparatus and a navigation communication system which are capable of offering a clear display and preventing vehicle position information from draining out to third parties.

A mobile vehicle navigation apparatus according to the present invention displaying the position of a mobile vehicle on a display, comprises a receiver for receiving information transmitted from another mobile vehicle, indicative of the position of the other mobile vehicle, a setting unit for setting the other mobile vehicle in either a valid state or an invalid state, and a display unit for displaying the position of the other mobile vehicle received by the receiver on the display when the other mobile vehicle is set in the valid state.

Also, a navigation communication system according to the present invention is comprised of a mobile vehicle navigation apparatus equipped in each of a plurality of mobile vehicles for displaying the position of the mobile vehicle on a display, and a communication service center, wherein the mobile vehicle navigation apparatus equipped in one mobile vehicle comprises an own position detector for detecting its own position, and a transmitter for transmitting position information indicative of the own position to the communication service center to transmit the position information to a mobile vehicle navigation apparatus equipped in another mobile vehicle, the communication service center comprises a receiver for receiving the position information transmitted from the mobile vehicle navigation apparatus equipped in the one mobile vehicle, and a transmitter for transmitting the received position information to a mobile vehicle navigation apparatus equipped in another mobile vehicle, and the mobile vehicle navigation apparatus equipped in the other mobile vehicle comprises a receiver for receiving the position information transmitted from the communication service center, and a display unit for displaying the position of the mobile vehicle on a display based on the received position information, wherein the position of the one mobile vehicle is displayed on the display of the mobile vehicle navigation apparatus equipped in the other mobile vehicle.

DETAILED DESCRIPTION OF THE EMBODIMENT

In the following, one embodiment of the present invention will be described in detail with reference to the accompanying drawings.

Figure 1:
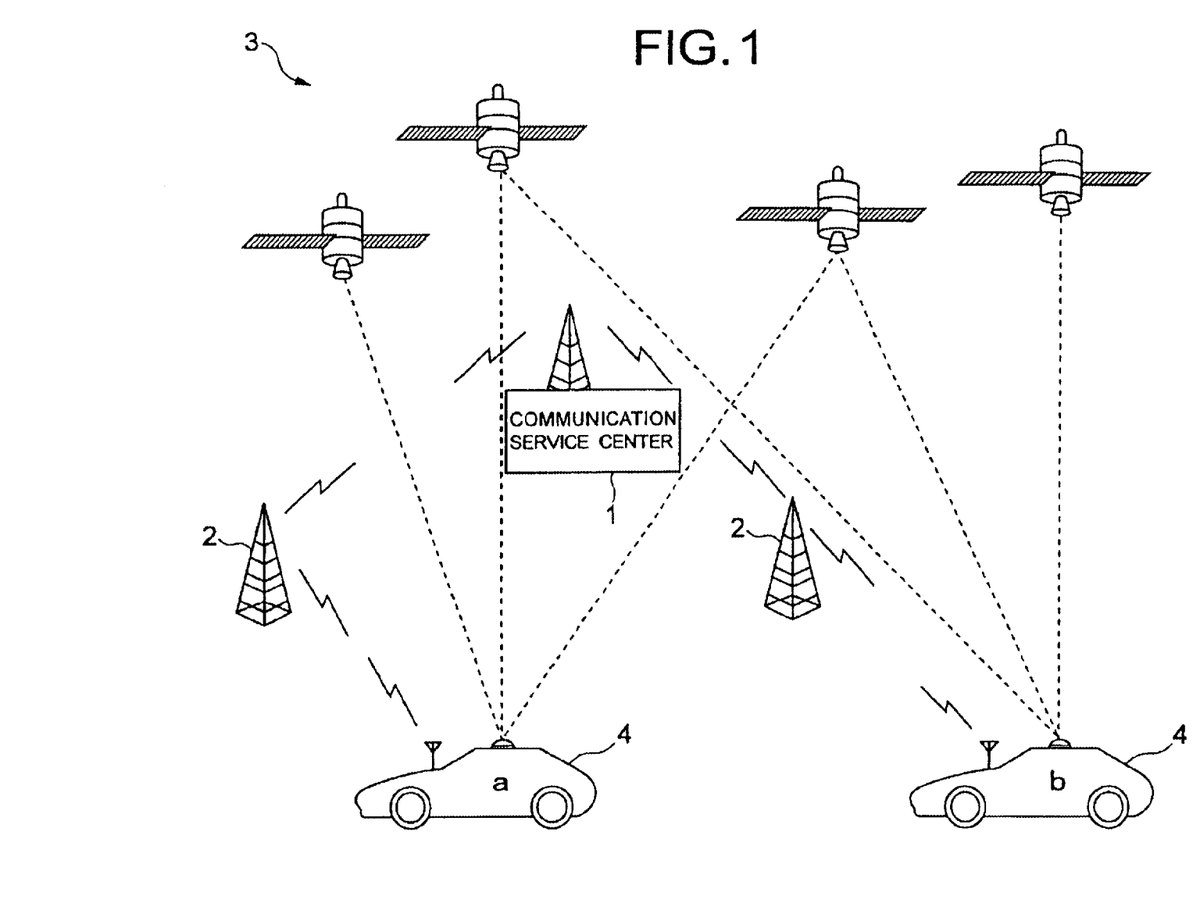
FIG. 1 is a diagram generally illustrating a navigation communication system.

FIG. 1 illustrates a navigation communication system which comprises a plurality of vehicles, each equipped with a mobile vehicle navigation apparatus according to the present invention.

As illustrated in FIG. 1, the navigation communication system comprises a communication service center 1, a relay station 2, GPS (Global Positioning System) satellites 3, and the plurality of vehicles 4 each equipped with the vehicle-equipped navigation apparatus.

The communication service center 1 is administrated, for example, by a portable telephone business entity for providing a navigation data communication service which utilizes this navigation system only for registered users.

Figure 2:
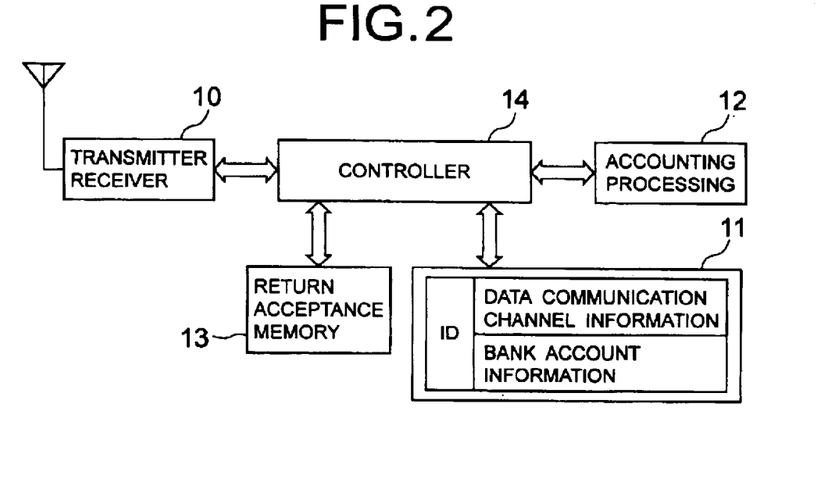
FIG. 2 is a block diagram illustrating the configuration of a communication service unit installed in a communication service center 1.

FIG. 2 illustrates the configuration of a communication service unit installed in the communication service center 1.

As illustrated in FIG. 2, the communication service unit comprises a transmitter/receiver 10 for governing communications with each of the vehicles 4; a database 11; an accounting processor 12; a return acceptance memory 13; and a controller 14 for controlling each of these functional modules. The database 11 are registered with data communication channel information allocated to each registered user and bank account information declared by each registered user in correspondence to each user ID.

Upon receipt of a variety of messages transmitted from the vehicles 4 through the relay station 2 and the transmitter/receiver 10, the controller 14 controls the accounting processor 12 for prompting accounting processing (later described) in accordance with a received message, as described later. Further, the controller 14 controls the transmitter/receiver 10 to forward the message to the mobile vehicle navigation apparatus equipped in a remote vehicle (vehicle 4) indicated by the received message.

Figure 3:
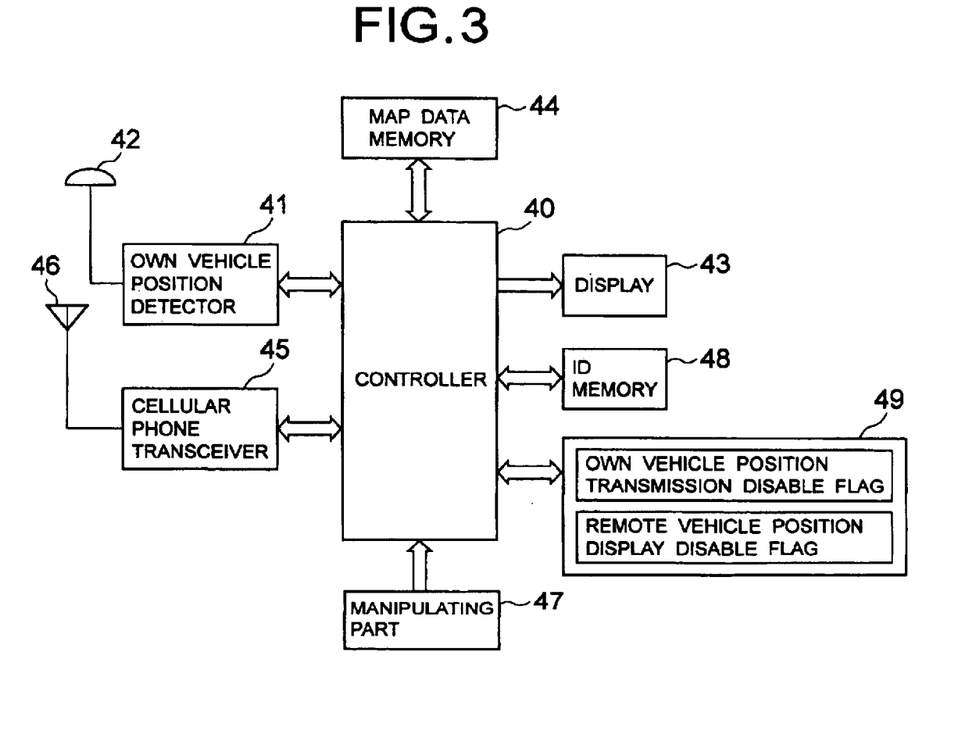
FIG. 3 is a block diagram illustrating the configuration of a mobile vehicle navigation apparatus equipped in a vehicle 4.

FIG. 3 illustrates the configuration of the mobile vehicle navigation apparatus equipped in each of the vehicles 4.

As illustrated in FIG. 3. the mobile vehicle navigation apparatus comprises an own vehicle position detector circuit 41, a GPS antenna 42, a display device 43, a map data memory 44, a cellular phone transceiver circuit 45, a cellular phone antenna 46, a manipulating part 47, an ID memory 48, and a flag register 49.

The own vehicle position detector 41 calculates a current position of the vehicle, equipped with the navigation apparatus, based on a received signal generated from radio waves transmitted from the GPS satellites 3 and received through the GPS antenna 42, and supplies the controller 40 with vehicle position information indicative of the position. The controller 40 conducts a control in accordance with an own vehicle position display routine (not shown) to display a map with an own vehicle mark added thereto on a display screen of the display device 43. More specifically, the controller 40 first reads map data including a position indicated by the vehicle position information from map data for each regional segment stored in the map data memory 44. Then, the controller 40 generates display map data which has a mark indicative of the own vehicle position superimposed on a map represented by the map data, and supplies the display device 43 with this display map data.

Figure 4:
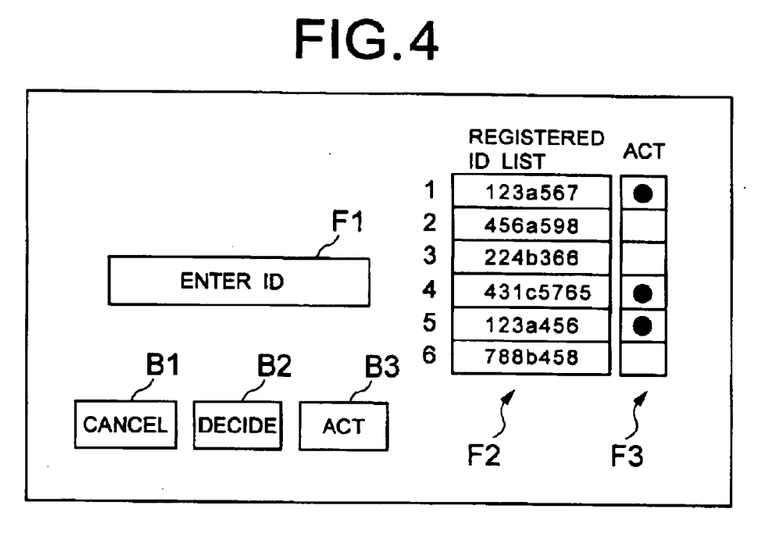
FIG. 4 is a diagram Illustrating an exemplary ID entry screen.

The manipulating part 47 accepts not only a variety of manipulations for operating the navigation apparatus but also manipulations as described blow (from the user), and supplies the controller 40 with a signal corresponding to each manipulation. Specifically, the manipulation part 47 is used to accept entry and setting for registering a remote vehicle ID; setting as to whether a remote vehicle position is permitted for display; and setting as to whether the own vehicle position may be transmitted to remote vehicles. Here, the controller 40 stores in the flag register 49 an own vehicle position transmission disable flag which is at logical level "1" when a setting manipulation is performed to disable the transmission of the own vehicle position through a manipulation of the user using the manipulating part 47, and at logical level "0" when a setting manipulation is performed to enable the transmission of the own vehicle position to remote vehicles. Also, the controller 40 stores in the flag register 49 a remote vehicle position display disable flag which is at logical level "1" when a setting manipulation is performed to disable a remote vehicle position to be displayed on the screen of the display device 43 through a manipulation of the user using the manipulation part 47, and at logical level "0" when a setting manipulation is performed to enable the remote vehicle position to be displayed. Further, the controller 40 first supplies the display device 43 with an image display instruction for displaying an ID entry screen as illustrated in FIG. 4 when entry and registration setting manipulations are performed for a remote vehicle ID through manipulations of the user using the manipulating part 47. Here, the user manipulates the manipulating part 47 to enter ID of a friend or a user who belongs to a particular group, i.e., a remote vehicle ID in an ID entry field F1 as shown in FIG. 4, and clicks a mouse on a decision button display B2. In response to these manipulations, the controller 40 stores the remote vehicle ID entered in the ID entry field F1 in the ID memory 48 for registration, and controls the display device 43 to display the ID in a registered ID list display field F2 in FIG. 4. The ID memory 48 previously stores an own vehicle ID other than remote vehicle IDs registered as described above. Further, the user manipulates the manipulating part 47 to perform a setting as to whether or not the remote vehicle ID is made valid for each of remote vehicle IDs registered as described above, i.e., remote vehicle IDs displayed in the registered ID list display field F2. For example, the user may specify a remote vehicle ID, which he wants to make valid, from the remote vehicle IDs displayed in the registered ID list display field F2, and clicks on an ACT button display B3. In response to the clicking, the controller 40 stores the remote vehicle ID with a valid flag at logical level "1" added thereto in the ID memory 48. In this event, on a valid flag display field F3, a black circle mark is displayed only for the remote vehicle ID to which the valid flag has been added.

The cellular phone transceiver circuit 45 supplies the controller 40 with a variety of messages (later described) from the communication service center 1 received through the cellular phone antenna 46. Also, the cellular phone transceiver circuit 45 transmits a variety of messages (later described) supplied from the controller 40 to the communication service center 1 through the cellular phone antenna 46.

In the following, the operation of the mobile vehicle navigation apparatus will be described.

Figure 5:
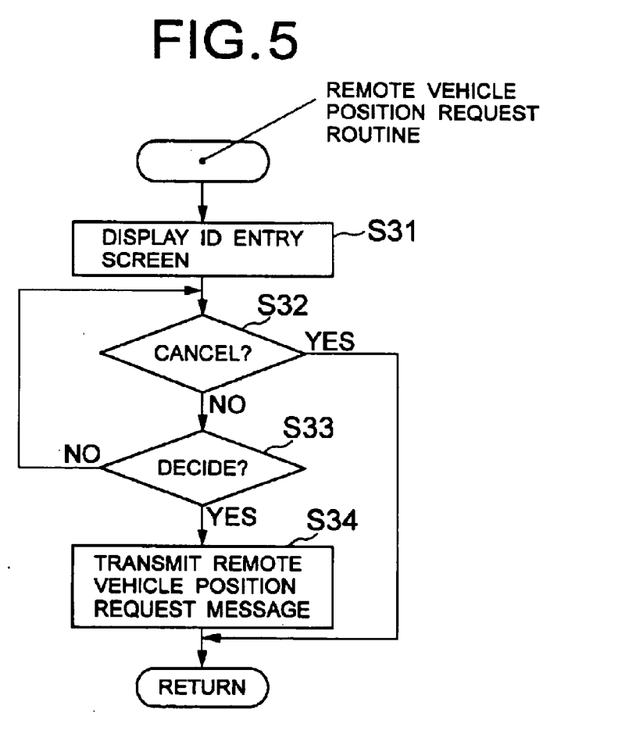
FIG. 5 is a flow chart illustrating.a remote vehicle position request routine.

First, as the user manipulates the manipulating part 47 to issue a remote vehicle position display instruction, the controller 40 proceeds to execution of a remote vehicle position request routine as illustrated in FIG. 5.

In FIG. 5, the controller 40 first supplies the display device 43 with an image display instruction for displaying the ID entry screen illustrated in FIG. 4 for the user to specify a remote vehicle to be displayed (step S31). Next, the controller 40 determines whether or not the user clicks on a cancel button display B1 shown in FIG. 5 through a cursor manipulation using the manipulating part 47 (step S32). When determining at step S32 that the user does not click on the cancel button display B1, the controller 40 determines whether or not the user clicks on the decision button display B2 shown in FIG. 4 by a cursor manipulation using the manipulating part 47 (step S33). When determining at step S33 that the user does not click on the decision button display B2, the controller 40 returns to the execution of step S32 to repeatedly perform the operation as described above.

Incidentally, the user manipulates the manipulating part 47 to enter a remote ID indicative of a party (remote vehicle), the current position of which the user wants to confirm, in the ID entry field F1 as shown in FIG. 4. Alternatively, the user may specify a remote vehicle ID. the current position of which he wants to confirm, from the registered ID list display field F2 which displays previously registered remote vehicle IDs in the form of list, instead of entering a remote vehicle ID in the ID entry field F1.

Figure 6:
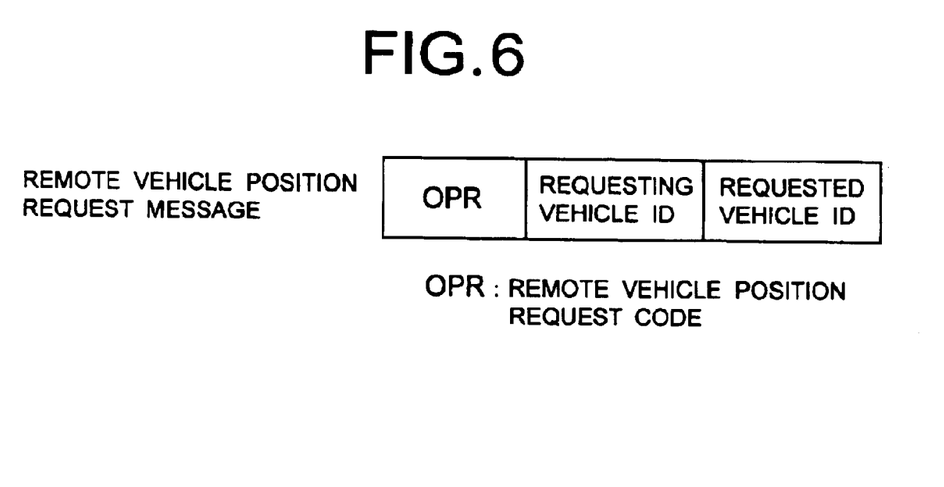
FIG. 6 is a diagram showing a format of a remote vehicle position request message.

As the user has entered or specified the remote vehicle ID as described above, the user clicks on the decision button display B2 through a cursor manipulation using the manipulating part 47. In response to this clicking, the controller 40 generates a remote vehicle position request message as shown in FIG. 6, and supplies this to the cellular phone transceiver circuit 45 (step S34). Specifically, the controller 40 first sets the own vehicle ID as a requesting vehicle ID, and the remote vehicle ID entered in the remote vehicle ID entry field F1 (or the specified remote vehicle ID) as a requested vehicle ID. Then, the controller 40 adds a remote vehicle position request code OPR to the head of these requesting vehicle ID and requested vehicle ID to generate the remote vehicle position request message as shown in FIG. 6 which is transmitted to the communication service center 1.

After the execution of step S34, or when determining at step S32 that the user clicks on the cancel button display B1, the controller 40 exits the remote vehicle position request routine illustrated in FIG. 5 to return to the execution of a main routine (not described).

Figure 7:
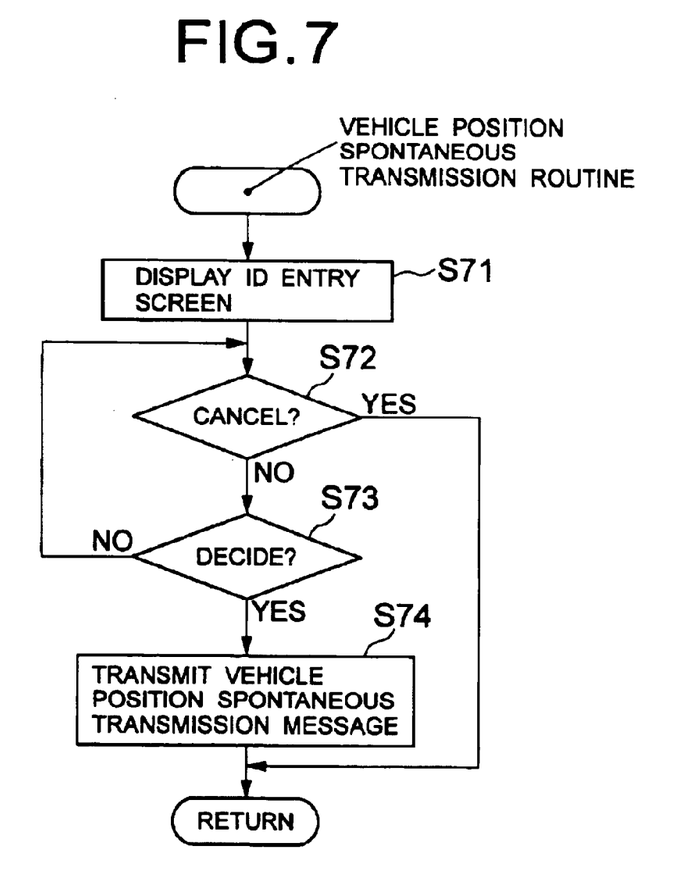
FIG. 7 is a flow chart illustrating a vehicle position spontaneous transmission routine.

Alternatively, as the user performs an own vehicle position spontaneous transmission instruction through a manipulation on the manipulating part 47, the controller 40 proceeds to execution of a vehicle position spontaneous transmission routine as illustrated in FIG. 7.

In FIG. 7, the controller 40 first supplies the display device 43 with an image display instruction for displaying the ID entry screen illustrated in FIG. 4 for the user to specify a remote vehicle to which the own vehicle position is to be transmitted (step S71). Next, the controller 40 determines whether or not the user clicks on a cancel button display B1 shown in FIG. 4 through a cursor manipulation using the manipulating part 47 (step S72). When determining at step S72 that the user does not click on the cancel button display B1, the controller 40 determines whether or not the user clicks on the decision button display B2 shown in FIG. 4 (step S73). When determining at step S73 that the user does not click on the decision button display B2, the controller 40 returns to the execution of step S72 to repeatedly perform the operation as described above.

Incidentally, the user manipulates the manipulating part 47 to enter a remote ID indicative of a party (remote vehicle), to which the own vehicle position is notified, in the remote vehicle ID entry field F1 as shown in FIG. 4. Alternatively, in this event, the user may specify a remote vehicle ID, to which the own vehicle position is notified, from the registered ID list display field F2 which displays previously registered remote vehicle IDs in the form of list, instead of entering a remote vehicle ID in the ID entry field F1.

Figure 8:
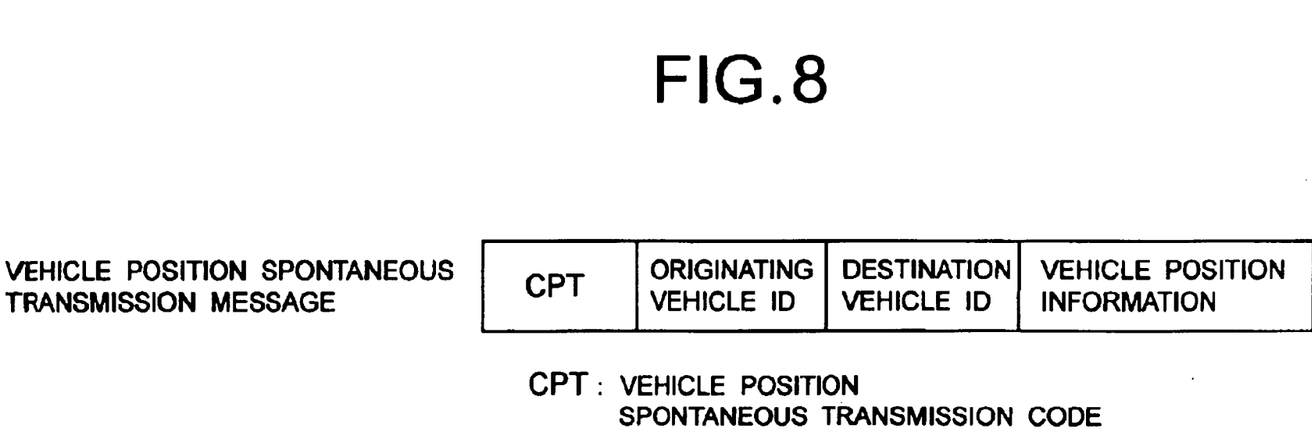
FIG. 8 is a diagram showing a format of a vehicle position spontaneous transmission message.

As the user has entered or specified the remote vehicle ID as described above, the user clicks on the decision button display B2 through a cursor manipulation using the manipulating part 47. In response to this clicking, the controller 40 generates a vehicle position spontaneous transmission message as shown in FIG. 8, and supplies this to the cellular phone transceiver circuit 45 (step S74). Specifically, the controller 40 first sets the own vehicle ID as an originating vehicle ID, and the remote vehicle ID entered in the remote vehicle ID entry field F1 (or the specified remote vehicle ID) as a destination vehicle ID, and adds vehicle position information supplied from the own vehicle position detector circuit 41 to this sequence. Then, the controller 40 adds a vehicle position spontaneous transmission code CPT to the head of the sequence to generate a remote vehicle position request message as shown in FIG. 8 which is transmitted to the communication service center 1. After the execution of step S74, or when determining at step S72 that the user clicks on the cancel button display B1, the controller 40 exits the vehicle position spontaneous transmission routine illustrated in FIG. 7 to return to the execution of a main routine (not described).

Next, the operation performed in the communication service unit (illustrated in FIG. 2) in the communication service center 1 will be described when the communication service center 1 receives a variety of messages transmitted by the vehicle 4 as described above.

Figure 9:
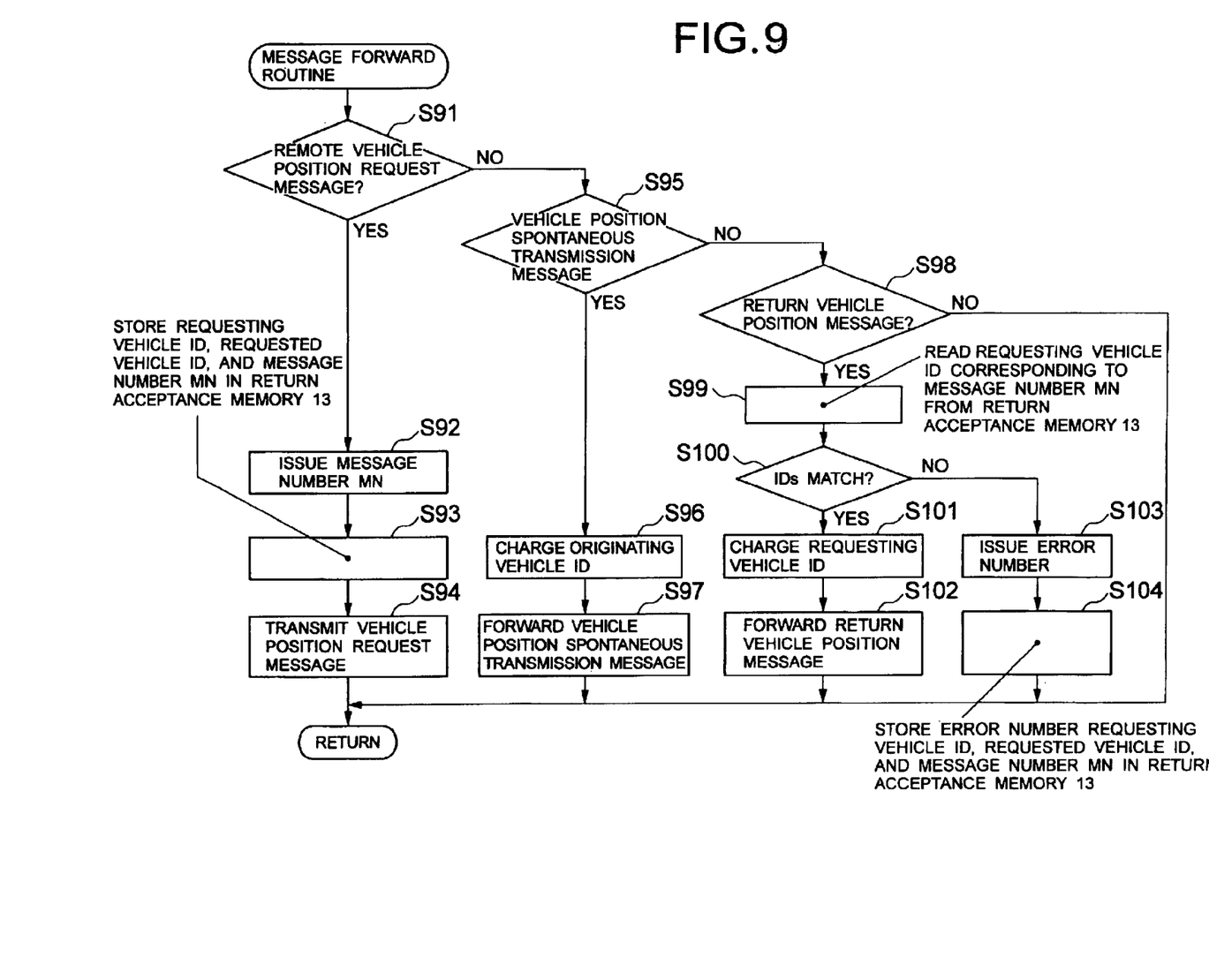
FIG. 9 is a flow chart illustrating a message forward routine.

As the transmitter/receiver 10 of the communication service unit receives a variety of messages from the vehicle 4, the controller 14 executes a message forward subroutine as illustrated in FIG. 9.

Figure 10:
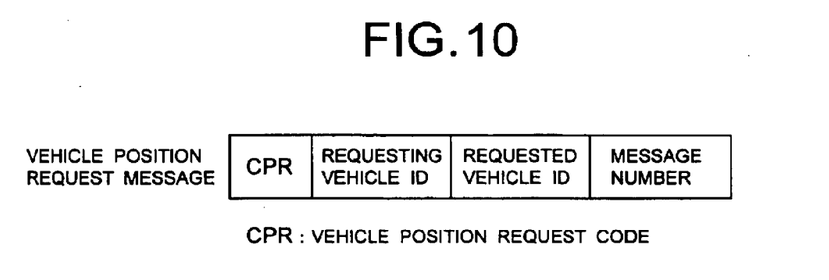
FIG. 10 is a diagram showing a format of a vehicle. position request message.

In FIG. 9, the controller 14 first determines whether or not a message received by the transmitter/receiver 10 is a remote vehicle position request message as shown in FIG. 6 (step S91). When determining at step S91 that the received message is the remote vehicle position request message. the controller 14 issues a message number MN corresponding to this remote vehicle position request message (step S92). Next, the controller 14 stores the requesting vehicle ID and requested vehicle ID in the remote vehicle position request message, current time information and the message number MN in correspondence in the return acceptance memory 13 (step S93). Next, the controller 14 generates a vehicle position request message as shown in FIG. 10 which includes the requesting vehicle ID, requested vehicle ID, message number MN, and vehicle position request code CPR added to the head of the sequence. Then, the controller 14 controls the transmitter/receiver 10 to transmit the vehicle position request message to a vehicle 4 which corresponds to the requested vehicle ID (step S94). Specifically, the controller 14 searches the database 11 for a data communication channel corresponding to the requested vehicle ID, and controls the transmitter/receiver 10 to establish a line connection with the data communication channel to transmit the vehicle position request message. With the execution of step S94, the transmitter/receiver 10 transmits the vehicle position request message to the vehicle 4 indicated by the requested vehicle ID.

On the other hand, when determining at step S91 that the received message is not the remote vehicle position request message, the controller 14 determines whether or not the received message is a vehicle position spontaneous transmission message as shown in FIG. 8 (step S95). When determining at step S95 that the received message is the vehicle position spontaneous transmission message, the controller 14 controls the accounting processor 12 to collect a predetermined service commission from a registered user indicated by an originating vehicle ID in the vehicle position spontaneous transmission message (step S96). Specifically, the controller 14 searches bank account information stored in the database 11 for a bank account number of the registered user corresponding to the originating vehicle ID, and supplies the bank account number to the accounting processor 12. In response, the accounting processor 12 transfers the service commission from the bank account indicated by the bank account number supplied from the controller 14. After the execution of step S96, the controller 14 controls the transmitter/receiver 10 to forward the received vehicle position spontaneous transmission message as it is to a vehicle 4 corresponding to the destination vehicle ID (step S97). Specifically, the controller 14 searches the database 11 for a data communication channel corresponding to the destination vehicle ID, and controls the transmitter/receiver 10 to establish a line connection with the data communication channel to transmit the vehicle position spontaneous transmission message. With the execution of step S97, the transmitter/receiver 10 transmits the vehicle position spontaneous transmission message to the vehicle 4 indicated by the destination vehicle ID.

On the other hand, when determining at step S95 that the received message is not the vehicle position spontaneous transmission message, the controller 14 determines whether or not the received message is a return vehicle position message (later described) (step S98). When determining at step S98 that the received message is the return vehicle position message, the controller 14 extracts the message number MN described in the return vehicle position message, and reads a requesting vehicle ID stored in correspondence to this message number MN from the return acceptance memory 13 (step S99). Next, the controller 14 determines whether or not the requesting vehicle ID read from the return acceptance memory 13 matches the requesting vehicle ID indicated in the return vehicle position message (step S100). When determining at step S100 that both requesting vehicle IDs match, the controller 14 controls the accounting processor 12 to collect a predetermined service commission from a registered user indicated by the requesting vehicle ID (step S101). Specifically, the controller 14 searches bank account information stored in the database 11 for a bank account number of the registered user corresponding to the requesting vehicle ID, and supplies the bank account number to the accounting processor 12. In response, the accounting processor 12 transfers the service commission from the bank account indicated by the bank account number supplied from the controller 14. After the execution of step S101, the controller 14 controls the transmitter/receiver 10 to forward the received return vehicle position message to a vehicle 4 corresponding to the requesting vehicle ID described in the return vehicle position message (step S102). Specifically, the controller 14 searches the database 11 for a data communication channel corresponding to the requesting vehicle ID, and controls the transmitter/receiver 10 to establish a line connection with the data communication channel to transmit the return vehicle position message. With the execution of step S102, the transmitter/receiver 10 transmits the return vehicle position message to the vehicle 4 indicated by the requesting vehicle ID.

Conversely, when determining at step S100 that the requesting vehicle ID read from the return acceptance memory 13 does not match the requesting vehicle ID indicated in the return vehicle position message, the controller 14 issues an error number (step S103). Then, the controller 14 stores each of the requesting vehicle ID, requested vehicle ID and message number MN indicated in the return vehicle position message in correspondence to the error number in the return acceptance memory 13 (step S104).

After the execution of step S104, S94, S97 or S102, the controller 14 exits the message forward routine illustrated in FIG. 9 to return to the execution of the main routine (not described).

Figure 12:
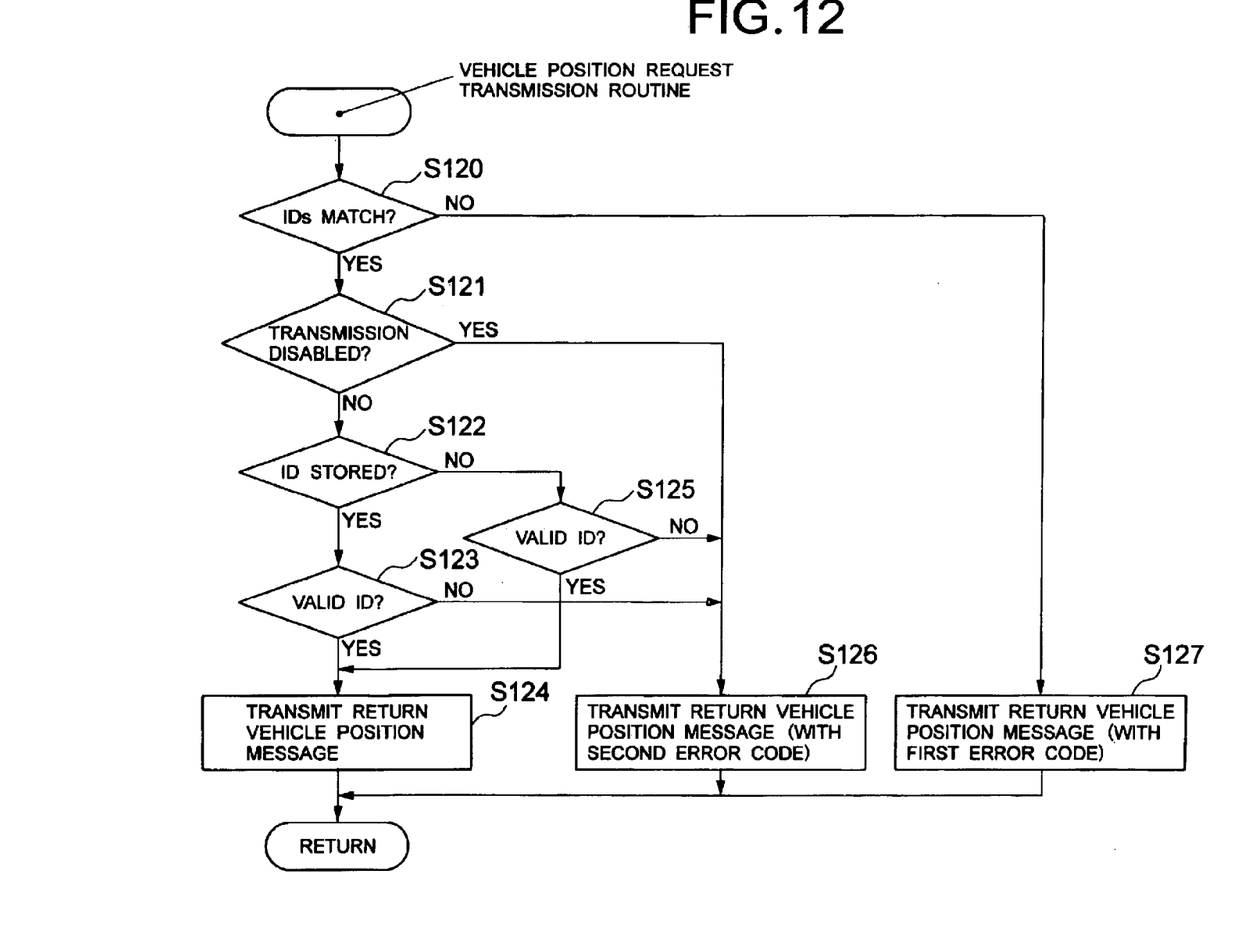
FIG. 12 is a flow chart illustrating a vehicle position request return routine.

Here, as the cellular phone transceiver circuit 45 built in the mobile vehicle navigation apparatus of the vehicle 4 receives the vehicle position request message transmitted from the communication service center 1 as described above, the controller 40 proceeds to execution of a vehicle position request return routine as illustrated in FIG. 12.

Figure 11:
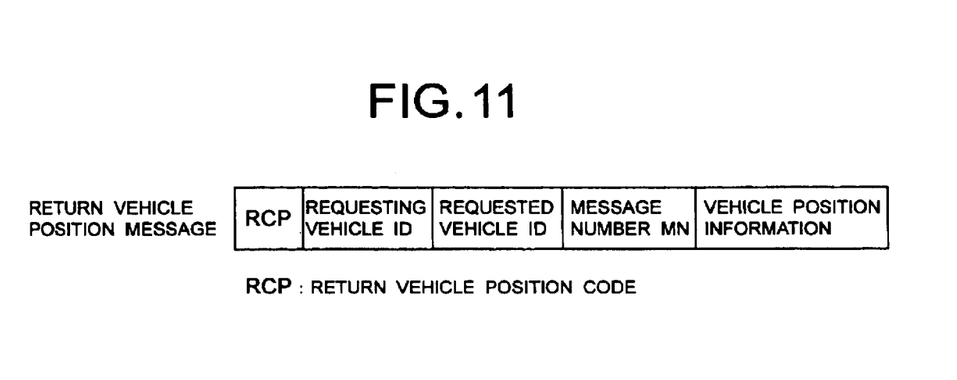
FIG. 11 is a diagram showing a format of a return vehicle position message.

In FIG. 12, the controller 40 first determines whether a requested vehicle ID described in the vehicle position request message as shown in FIG. 10, received by the cellular phone transceiver circuit 45 matches the own vehicle ID (step S120). When determining at step S120 that both IDs match, the controller 40 determines whether or not an own vehicle position transmission disable flag stored in the flag register 49 is at logical level "1" indicating that the transmission of the own vehicle position is disabled (step S121). When determining at step S121 that the own vehicle position transmission disable flag is not at logical level "1" indicating that the transmission of the own vehicle position is disabled, the controller 40 determines whether or not the same remote vehicle ID as the requesting vehicle ID indicated by the vehicle position request message is stored in the ID memory 48 (step S122). In other words, with the execution of step S122, the controller 40 determines whether or not the requesting vehicle ID indicated in the vehicle position request message has been registered in the ID memory 48. Here, when determining at step S122 that the same remote vehicle ID as the requesting vehicle ID has been stored in the ID memory 48, the controller 40 determines whether or not a valid flag at logical level "1" is added to this remote vehicle ID (step S123). When determining at step S123 that the valid flag at logical level "1" is added, the controller 40 generates a return vehicle position message as shown in FIG. 11, and supplies this message to the cellular phone transceiver circuit 45 (step S124). Specifically, the controller 40 first adds vehicle position information supplied from the own vehicle position detector circuit 41 to the requesting vehicle ID, requested vehicle ID and message number MN in the received vehicle position request message (shown in FIG. 10). Then, the controller 40 generates a return vehicle position message as shown in FIG. 11 by adding a return vehicle position code RCP to the head of the sequence, and transmits this message to the communication service center 1.

On the other hand, when determining at step S122 that the requesting vehicle ID indicated in the vehicle position request message is not stored in the ID memory 48, the controller 40 determines whether or not the requesting vehicle ID has been set in a valid state through a manipulation of the user using the manipulating part 47 (step S125). When determining at step S125 that the requesting vehicle ID has been set in the valid state, the controller 40 executes the foregoing step S124 to transmit a return vehicle position, message as shown in FIG. 11 to the communication service center 1. On the other hand, when determining at step S125 that the requesting vehicle ID is not set in the valid state, the controller 40 generates a return vehicle position message having a format shown in FIG. 13 instead of that shown in FIG. 11, and supplies this message to the cellular phone transceiver circuit 45 (step S126). In other words, when the requesting vehicle ID is set in an invalid state, the controller 40 omits vehicle position information from the return vehicle position message shown in FIG. 11, and adds a first error code ERR1, indicating that the transmission of the own vehicle position is rejected, to generate a return vehicle position message (shown in FIG. 13), and transmits this message to the communication service center 1. It should be noted that the controller 40 also executes step S126 when determining at step S123 that the valid flag at logical level "1" is not added to the requesting vehicle ID, or when determining at step S121 that the own vehicle position transmission disable flag is at logical level "1" indicating that the transmission of the own vehicle position is disabled.

As described above, when the requesting vehicle ID is set in the invalid state, the transmission of the own vehicle position is rejected, even if a request is made therefor.

Figure 14:
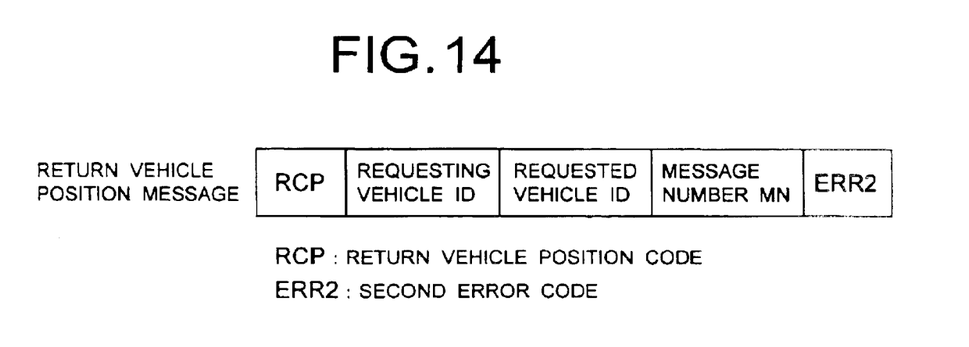
FIG. 14 is a diagram showing a format of a return vehicle position message (with a second error code)

On the other hand, when determining at step S120 that the requesting vehicle ID indicated in the received vehicle position request message as described above does not match the own vehicle ID, the controller 40 generates a return vehicle position message having a format shown in FIG. 14 instead of that shown in FIG. 11, and supplies this message to the cellular phone transceiver circuit 45 (step S127). Specifically, the controller 40 omits the vehicle position information from the return vehicle position message shown in FIG. 11, and adds a second error code ERR2, pointing out that the ID is improper, to generate a return vehicle position message as shown in FIG. 14, and transmits this message.to the communication service center 1.

After completion of the foregoing steps S124, S126 or S127, the controller 40 exits the vehicle position request return routine as illustrated in FIG. 12 to return to the execution of the main routine.

Figure 15:
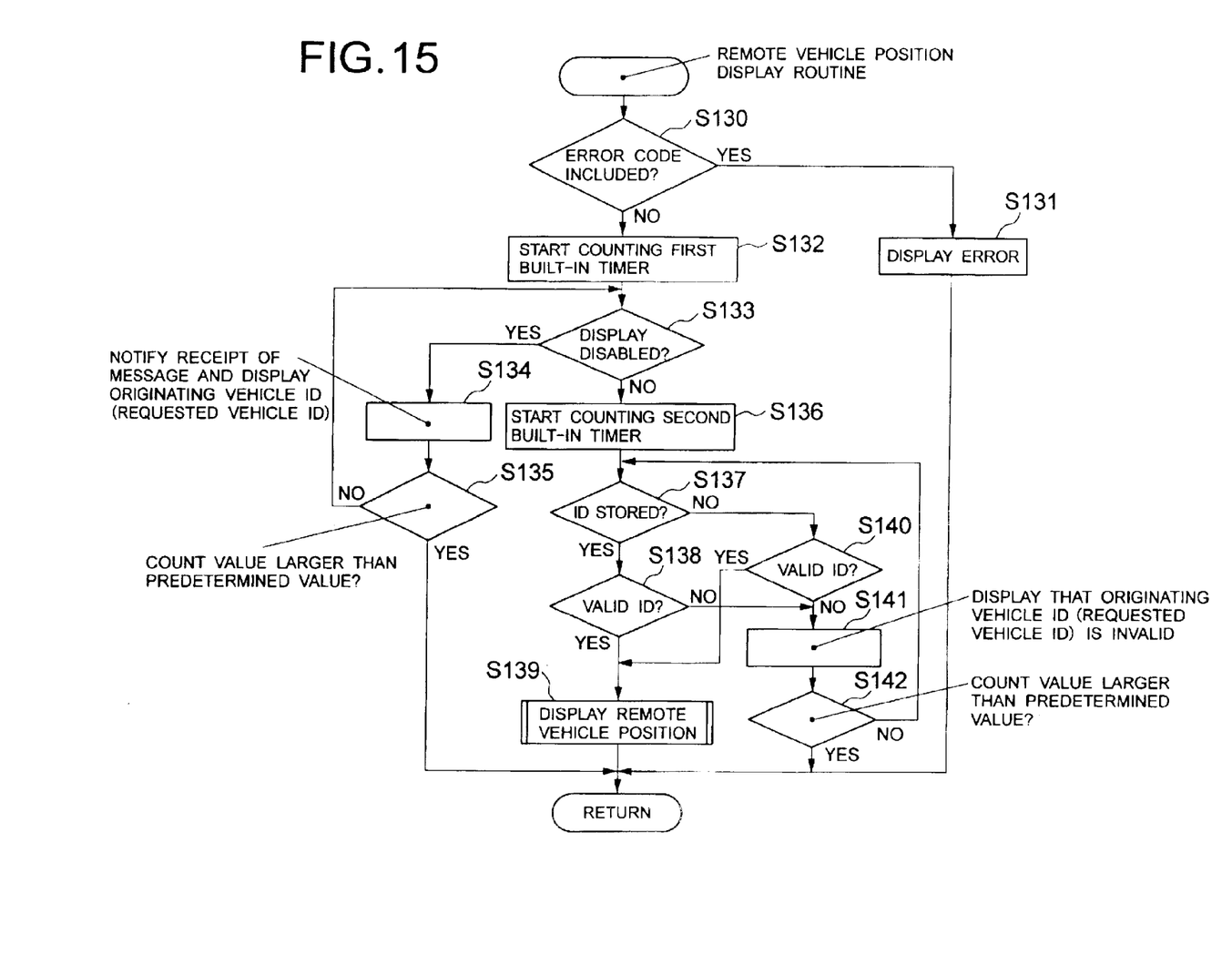
FIG. 15 is a flow chart illustrating a remote vehicle position display routine.

When the cellular phone transceiver 45 of the vehicle 4 receives the return vehicle position message (FIGS. 11, 13 or 14) or the vehicle position spontaneous transmission message (FIG. 8) transmitted by the communication service center 1 as described above, the controller 40 proceeds to execution of a remote vehicle position display routine as illustrated in FIG. 15.

Figure 13:
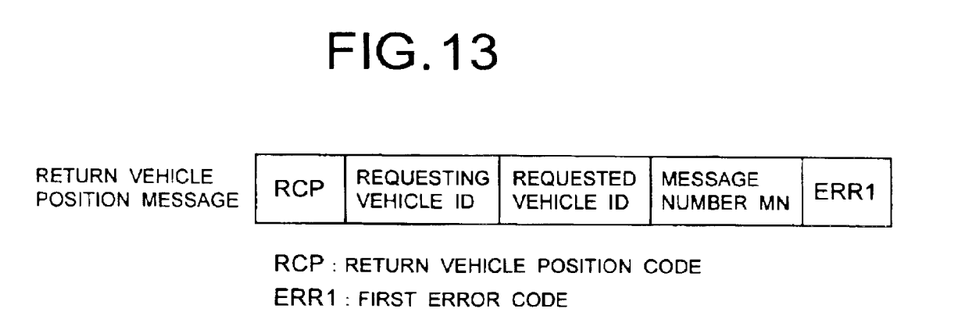
FIG. 13 is a diagram showing a format of a return vehicle position message (with a first error code)

In FIG. 15. the controller 40 first determines whether or not the first error code ERR1 or the second error code ERR2 shown in FIGS. 13 or 14 exists in the received message (step S130). When determining at step S130 that the first error code ERR1 or the second error code ERR2 exists in the received message, the controller 40 supplies the display device 43 with an image display instruction to display the contents indicated by each of these error codes (step S131). On the other hand, when determining at step S130 that either of the error codes does not exist in the received message, the controller 40 starts counting using a first built-in timer (not shown) (step S132). Next, the controller 40 determines whether or not a remote vehicle position display disable flag stored in the flag register 49 is at logical level "1" indicating that display of the remote vehicle position is disabled (step S133). Determining at step S133 that the remote vehicle position display disable flag is at logical level "1," the controller 40 notifies that a vehicle position spontaneous transmission message or a return vehicle position message has been received, and supplies the display device 43 with an image display instruction to display an originating vehicle ID (requested vehicle ID) described in the message (step S134). Next, the controller 40 determines whether or not a count value indicated by the first built-in timer is larger than a predetermined value (step S135). When determining at step S135 that the count value indicated by the first built-in timer is smaller than the predetermined value, the controller 40 returns to the execution of step S133 to repeatedly execute the operation as described above. Specifically, until the count value indicated by the first built-in timer exceeds the predetermined value, the controller 40 waits for the user to release the disabled remote vehicle position display, i.e., to set the remote vehicle position display disable flag to logical level "0" through a manual manipulation. Incidentally, as the user manipulates the manipulating part 47 to enable the remote vehicle position to be displayed, the remote vehicle position display disable flag stored in the flag register 49 transitions to logical level "0."

When determining at step S133 that the remote vehicle position display disable flag is not at logical level "1," i.e., display is not disabled, the controller 40 start counting using a second built-in timer (not shown) (step S136). Next, the controller 40 determines whether or not the same remote vehicle ID as the originating vehicle ID (requested vehicle ID) described in the received message is stored in the ID memory 48 (step S137). In other word, with the execution of step S137, the controller 40 determines whether or not the originating vehicle ID (requested vehicle ID) described in the received vehicle position spontaneous transmission message (or the return vehicle position message) has been registered in the ID memory 48. Here, when determining at step S137 that the same remote vehicle ID as the originating vehicle ID (requested vehicle ID) has been stored in the ID memory 48, the controller 40 determines whether or not a valid flag at logical level "1" is added to the remote vehicle ID. (step S138). When determining at step S138 that the valid flag at logical level "1" is added, the controller 40 proceeds to execution of a remote vehicle position display routine (step S139). In the remote vehicle position display routine, the controller 40 first fetches vehicle position information described in the received vehicle position spontaneous transmission message (FIG. 8) or return vehicle position message (FIG. 11) as remote vehicle position information. Next, the controller 40 fetches vehicle position information supplied form the own vehicle position detector circuit 41 as own vehicle position information. Next, the controller 40 reads map data including a position indicated by the remote vehicle position information and a position indicated by the own vehicle position information from map data of each regional segment stored in the map data memory 44. Then, the controller 40 generates display map data with a remote vehicle position mark added at the position indicated by the remote vehicle position information and an own vehicle position mark added at the position indicated by the own vehicle position information, and supplies this display map data to the display unit 43. In this way, a map with the added own vehicle position mark and remote vehicle position mark is displayed on the screen of the display device 43.

On the other hand, when determining at step S137 that the originating vehicle ID (requesting vehicle ID) described in the vehicle position spontaneous transmission message or the return vehicle position message is not stored in the ID memory 48, the controller 40 determines whether or not the originating vehicle ID (requesting vehicle ID) has been set in a valid state through a manipulation of the user using the manipulating part 47 (step S140). When determining at step S140 that the originating vehicle ID has been set in the valid state, the controller 40 next executes the foregoing step S139 to display the remote vehicle position together with the own vehicle position on the screen of the display unit 43, as described above. On the other hand, when determining at step S140 that the originating vehicle ID (requesting vehicle ID) is not set in the valid state, i.e., it is set in an invalid state, the controller 40 supplies the display device 43 with an image display instruction to display a message which points out that the originating vehicle ID (requesting vehicle ID) is in the invalid state (step S141). This step S141 is also executed when the controller 40 determines at step S138 that the valid flag at logical level "1" is not added to the same remote vehicle ID as the originating vehicle ID (requesting vehicle ID). After the execution of step S141, the controller 40 determines whether or not a count value indicated by the second built-in timer is larger than a predetermined value (step S142). When determining at step S142 that the count value indicated by the second built-in timer is smaller than the predetermined value, the controller 40 returns to the execution of step S137 to repeatedly execute the operation as described above. Specifically, until the count value indicated by the second built-in timer exceeds the predetermined value, the controller 40 waits for the user to set the originating vehicle ID (requesting vehicle ID) in the valid state through a manual manipulation.

When the count value indicated by the first (second) built-in timer exceeds the predetermined value at step S135 (or S142), or after the execution of the foregoing step S131 or S139, the controller 40 exits the remote vehicle position display routine as illustrated in FIG. 15 to proceed to the execution of the main routine.

Specifically, when the originating vehicle ID (requesting vehicle ID) is set in the invalid state, the remote vehicle position display routine (step S139) is not executed, so that the position of a vehicle (remote vehicle) indicated by this originating vehicle ID (requesting vehicle ID) is not displayed on the display device 43.

The following description will be made on the operation of the navigation communication system with reference to a communication operation performed between two vehicles 4a and 4b and the communication service center 1, as illustrated in FIG. 1. The navigation communication system has a vehicle position spontaneous transmission mode for voluntarily transmitting the position of the own vehicle to a specified remote vehicle, in addition to a remote vehicle position display mode for displaying the position of a remote vehicle, together with the position of the own vehicle, on the display device 43.

[Remote Vehicle Position Display Mode]

Figure 16:
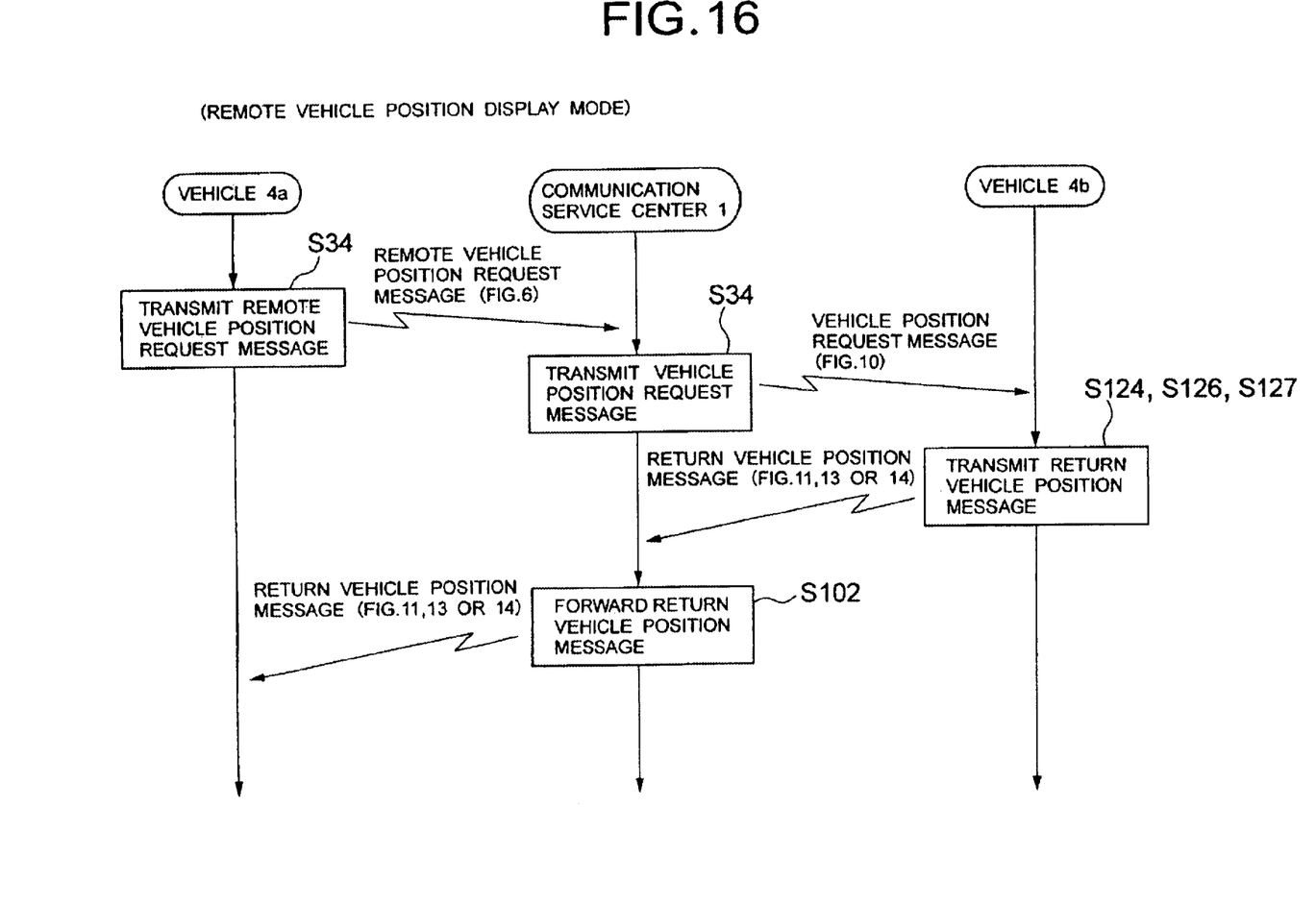
FIG. 16 is a diagram illustrating operations involved in communications performed between vehicles 4a, 4b and the communication service center 1 in a remote vehicle position display mode.

FIG. 16 illustrates a communication operation performed between the vehicles 4a, 4b and the communication service center 1 in the remote vehicle position display mode. FIG. 16 illustrates the operation performed when the vehicle 4a (own vehicle) displays a current position of the vehicle 4b (remote vehicle) on the display device 43 equipped in the own vehicle.

First, the user in the vehicle 4a manipulates the manipulating part 47 to enter ID of the vehicle 4b in the remote vehicle ID entry field F1 as shown in FIG. 4 to issue a remote vehicle position display instruction. In response, the remote vehicle position request routine as illustrated in FIG. 5 is executed, wherein at step S34, a remote vehicle position request message as shown in FIG. 6 is transmitted from the vehicle 4a to the communication service center 1.

In the communication service center 1, as the remote vehicle position request message is received from the vehicle 4a, the message forward routine illustrated in FIG. 9 is executed. Then, at step S94 of the message forward routine, a vehicle position request message as shown in FIG. 10 is transmitted to a requested vehicle ID described in the received remote vehicle position request message, i.e., to the vehicle 4b.

Upon receipt of the vehicle position request message from the communication service center 1, the vehicle 4b executes the vehicle position request return routine as illustrated in FIG. 12. In the vehicle position request return routine, when a requesting vehicle ID described in the vehicle position request message (i.e., that indicative of the vehicle 4a) is set In the valid state, step S124 is executed in the vehicle 4b. In this way, the vehicle 4b generates a return vehicle position message including vehicle position information created by the own vehicle position detector circuit 41, as shown in FIG. 11, and transmits this message to the communication service center 1. When the requested vehicle ID described in the vehicle position request message (i.e., that indicative of the vehicle 4b) is different from ID of the vehicle 4b itself, step S127 is executed instead of step S124. In this way, the vehicle 4b transmits to the communication service center 1 a return vehicle position message having the format as shown in FIG. 14, to which the second error code ERR2 is added for pointing out that the ID is improper, instead of the vehicle position information. On the other hand, when the requesting vehicle ID (i.e., the vehicle 4a) described in the vehicle position request message is not set in the valid state, step S126 is executed instead of the aforementioned step S124. Specifically, the vehicle 4b transmits to the communication service center 1 a return vehicle position message having the format as shown in FIG. 13, to which the first error code ERR1 is added for indicating that the vehicle 4b rejects to notify the vehicle 4a of its own vehicle position (vehicle 4b), instead of the vehicle position information.

Upon receipt of the return vehicle position request message from the vehicle 4b, the communication service center 1 executes the message forward routine illustrated in FIG. 9, wherein a service commission is transferred from a bank account of a requesting vehicle ID (vehicle 4a) described in the message (step S101). Then, the communication service center 1 forwards this return vehicle position message to the requesting vehicle ID described in the return vehicle position message, i.e., to the vehicle 4a, by executing step S102.

Upon receipt of the return vehicle position message from the communication service center 1, the vehicle 4a executes the remote vehicle position display routine as illustrated in FIG. 13. In this event, when determining at step S138 or S140 that the requested vehicle ID described in the return vehicle position message (i.e., that indicative of the vehicle 4b) is set in the valid state. step S139 is executed. Specifically, when the requested vehicle ID indicative of the vehicle 4b is set in the valid state, the position of the vehicle 4b (remote vehicle) is displayed together with the position of the vehicle 4a (own vehicle) on the screen of the display device 43 equipped in the vehicle 4a by the execution of step S139.

On the other hand, when an error code (ERR1, ERR2) is described in the received return vehicle position message, or when the requested vehicle ID indicative of the vehicle 4b is not set in the valid state, the foregoing step S139 is not executed. Specifically, only the position of the vehicle 4a (own vehicle) is displayed but not the position of the vehicle 4b (remote vehicle) on the screen of the display device 43 equipped in the vehicle 4a.

[Vehicle Position Spontaneous Transmission Mode]

Figure 17:
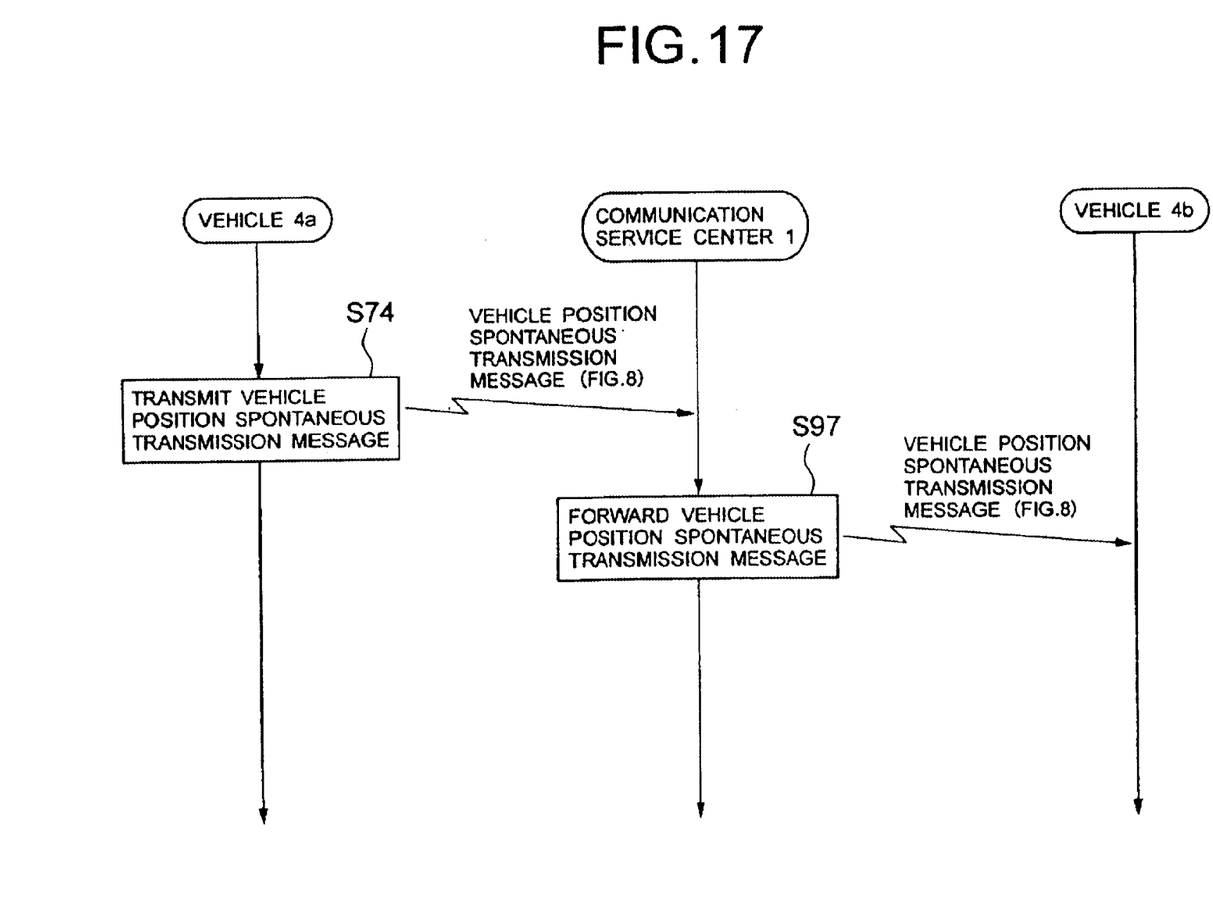
FIG. 17 is a diagram illustrating operations involved in communications performed between vehicles 4a, 4b and the communication service center 1 in a vehicle position spontaneous transmission mode.

FIG. 17 illustrates a communication operation performed between the vehicles 4a, 4b and the communication service center 1 in the vehicle position spontaneous transmission mode. FIG. 17 illustrates the operation performed when the vehicle 4a (own vehicle) transmits its own current position to the vehicle 4b (remote vehicle).

First, the user in the vehicle 4a manipulates the manipulating part 47 to enter ID of the vehicle 4b in the remote vehicle ID entry field F1 as shown in FIG. 4 to issue a vehicle position spontaneous transmission instruction. In response, the vehicle position spontaneous transmission routine as illustrated in FIG. 7 is executed, wherein at step S74, a vehicle position spontaneous transmission message as shown in FIG. 8 is transmitted from the vehicle 4a to the communication service center 1.

Upon receipt of the vehicle position spontaneous transmission message from the vehicle 4a, the communication service center 1 executes the message forward routine illustrated in FIG. 9, wherein a service commission is first transferred from a bank account of an originating vehicle ID (vehicle 4a) described in the message (step S96). Then, the communication service center 1 forwards this vehicle position spontaneous transmission message to a vehicle indicated by the destination vehicle ID described in the vehicle position spontaneous transmission message, i.e., to the vehicle 4b, by the execution of step S97.

Upon receipt of the vehicle position spontaneous transmission message from the communication service center 1, the vehicle 4b executes the remote vehicle position display routine as illustrated in FIG. 13. In this event, when determining at step S138 or S140 that the originating vehicle ID described in the vehicle position spontaneous transmission message (i.e.. that indicative of the vehicle 4a) is set in the valid state, step S139 is executed. Specifically, when the originating vehicle ID indicative of the vehicle 4a is set in the valid state, the position of the vehicle 4a is displayed together with the position of the vehicle 4b on the screen of the display device 43 equipped in the vehicle 4b by the execution of step S139.

On the other hand, when the originating vehicle ID is not set in the valid state, the foregoing step S139 is not executed, in which case only a current position of the vehicle 4b is displayed on the screen of the display device 43 equipped in the vehicle 4b.

As described above, since the mobile vehicle navigation apparatus according to the present invention displays only the position of a vehicle (remote vehicle) which is set in a valid state by the user, a clear navigation display can be provided. Also, in the navigation communication system according to the present invention, even if a request for vehicle position information is made from a remote vehicle, the position of the vehicle is not notified except for vehicles which are set in a valid state by the user, thereby making it possible to prevent own vehicle position information from draining out to third parties.

This application is based on Japanese Patent Application No. 2000-252482 which is herein incorporated by reference.

What is claimed is:

1. A mobile vehicle navigation apparatus for displaying the position of a mobile vehicle on a display, comprising:
   a receiver for receiving information transmitted from another mobile vehicle, indicative of the position of said other mobile vehicle;
   a setting part for allowing a user to set said other mobile vehicle either in a valid state or in an invalid state, in order to enable or disable said other mobile vehicle, at any particular time; and
   a display part for displaying the position of said other mobile vehicle received by said receiver on said display when said other mobile vehicle is set in the valid state.

2. A mobile vehicle navigation apparatus for displaying the position of a mobile vehicle on a display, comprising:
   a transmitter for transmitting a mobile vehicle position request message for requesting another mobile vehicle for its position;
   a receiver for receiving a mobile vehicle position return message returned from said other mobile vehicle, said message including mobile vehicle position information indicative of the position of said other mobile vehicle;
   a setting part for allowing a user to set said other mobile vehicle either in a valid state or in an invalid state, in order to enable or disable said other mobile vehicle, at any particular time;
   a determining part responsive to receipt of said mobile vehicle position return message for determining whether or not said other mobile vehicle, which is the originator of said mobile vehicle position return message, is set in the valid state; and
   a display part for displaying the position of said other mobile vehicle indicated by mobile vehicle position information included in said mobile vehicle position return message on said display, when said determining part determines that said other mobile vehicle is in the valid state.

3. A mobile vehicle navigation method for a mobile vehicle, comprising:
   receiving information transmitted from another mobile vehicle, indicative of the position of said other mobile vehicle;
   setting said other mobile vehicle either in a valid state or in an invalid state via a setting operation which allows a user to enable or disable said other mobile vehicle at any particular time; and
   displaying the position of said other mobile vehicle received by said receiver when said other mobile vehicle is set in the valid state.

4. A mobile vehicle navigation method for a mobile vehicle, comprising:
   transmitting a mobile vehicle position request message for requesting another mobile vehicle for its position;
   receiving a mobile vehicle position return message returned from said other mobile vehicle, said message including mobile vehicle position information indicative of the position of said other mobile vehicle;
   setting said other mobile vehicle either in a valid state or in an invalid state via a setting operation which allows a user to enable or disable said other mobile vehicle at any particular time;
   determining, in response to receipt of said mobile vehicle position return message, whether or not said other mobile vehicle, which is the originator of said mobile vehicle position return message, is set in the valid state; and
   displaying the position of said other mobile vehicle indicated by mobile vehicle position information included in said mobile vehicle position return message, when it is determined that said other mobile vehicle is in the valid state.

* * * * *